United States Patent [19]

Doak

[11] Patent Number: 4,595,727

[45] Date of Patent: Jun. 17, 1986

[54] BLENDS OF A POLYGLUTARIMIDE WITH A RUBBER-MODIFIED VINYL CHLORIDE RESIN

[76] Inventor: Kenneth W. Doak, 3469 Burnett Dr., Murrysville, Pa. 15668

[21] Appl. No.: 729,819

[22] Filed: May 2, 1985

[51] Int. Cl.$^4$ .................. C08L 51/04; C08L 33/24; C08L 33/12; C08L 27/06
[52] U.S. Cl. .................................. 525/71; 525/73; 525/80; 525/75; 525/192; 525/194
[58] Field of Search .............. 525/73, 71, 75, 80, 525/192, 194

[56] References Cited

U.S. PATENT DOCUMENTS

| | | | |
|---|---|---|---|
| 3,626,033 | 12/1971 | Keskkula et al. | 260/876 R |
| 3,652,726 | 3/1972 | Nield et al. | 260/876 R |
| 3,925,510 | 12/1975 | Ide et al. | 260/876 R |
| 4,217,424 | 8/1980 | Weese et al. | 525/67 |
| 4,255,322 | 3/1981 | Kopchik | 260/45.75 K |
| 4,339,554 | 7/1982 | Doak | 525/63 |
| 4,454,300 | 6/1984 | Ranade et al. | 525/71 |
| 4,458,046 | 7/1984 | Hornbaker et al. | 524/399 |
| 4,469,844 | 9/1984 | Doak | 525/71 |
| 4,469,845 | 9/1984 | Doak | 525/71 |

OTHER PUBLICATIONS

Chem. Abstract 99: 196047g; 196,048h 99, p. 45, 1983.

*Primary Examiner*—Carman J. Seccuro
*Attorney, Agent, or Firm*—Parmelee, Miller, Welsh & Kratz

[57] ABSTRACT

Thermoplastic blends having high heat distortion temperature and impact strength comprise 10–90 weight percent of a polyglutarimide, and 90–10 weight percent of a rubber-modified vinyl chloride resin prepared by polymerization of vinyl chloride in the presence of 2 to 50 percent of a rubber to form a graft copolymer.

15 Claims, No Drawings

BLENDS OF A POLYGLUTARIMIDE WITH A RUBBER-MODIFIED VINYL CHLORIDE RESIN

FIELD OF THE INVENTION

The present invention relates to thermoplastic blends having high impact strength and high heat distortion temperatures, and specifically to blends of a polyglutarimide with a rubber-modified vinyl chloride resin that is prepared by polymerizing vinyl chloride in the presence of 2 to 50 percent of a rubber.

BACKGROUND OF THE INVENTION

Vinyl chloride resins have good physical properties and generally have satisfactory molding characteristics, although the use of a plasticizer and/or a high processing temperature is frequently required (U.S. Pat. No. 3,925,510). However, they have a relatively low softening temperature, e.g. 65°–75° C., and when a large amount, up to about 30 percent, of a relatively low molecular weight plasticizer is added to improve processability and flexibility, the softening temperature may be significantly reduced, e.g. to 60° C. or lower. In the past, various copolymers or terpolymers with higher softening temperatures than a vinyl chloride resin have been blended into the vinyl chloride resin in order to provide good dimensional stability at a higher temperature.

It is well-known that a polyblend of a vinyl chloride resin with an ABS resin (a graft copolymer of styrene, acrylonitrile, and rubber, usually butadiene-based) has a higher softening temperature than that of the vinyl chloride resin. For example, U.S. Pat. No. 3,626,033 shows that a blend of a vinyl chloride resin and an ABS resin in a 75:25 ratio exhibits a softening temperature of 77.5° C., compared with 71.5° C. for the vinyl chloride resin alone. The addition of 20 percent of a copolymer of styrene and maleic anhydride as a third component further increased the softening temperature to 91° C. My U.S. Pat. Nos. 4,469,844 and 4,469,845 summarize prior art on blends containing vinyl chloride resins and various rubber-modified and unmodified copolymers of styrene, maleic anhydride, and optionally up to 25 weight percent of acrylonitrile or methyl methacrylate. The blends could optionally contain an ABS resin or an MBS resin (a graft copolymer of styrene, methyl methacrylate and a rubber).

U.S. Pat. Nos. 4,469,844 and 4,469,845 also describe improved polyblends of rubber-modified vinyl chloride resins (graft copolymers of vinyl chloride and a rubber) with rubber-modified or unmodified copolymers of a vinyl aromatic monomer, maleic anhydride, and optionally up to 25 weight percent of acrylonitrile or methyl methacrylate, the polyblends optionally containing ABS, MBS, or an ungrafted rubber. Such polyblends exhibited higher softening temperatures than that of the vinyl chloride resin. U.S. Pat. No. 4,454,300 describes polyblends of graft copolymers of vinyl chloride and polyolefin rubbers.

Various copolymers of styrene and imide derivatives of maleic anhydride have been blended with unmodified vinyl chloride resins in order to obtain increased softening temperatures. U.S. Pat. No. 4,339,554 describes polyblends containing copolymers of styrene and maleimide. U.S. Pat. No. 4,458,046 describes polyblends of vinyl chloride resins with copolymers of styrene and imide derivatives, optionally containing impact modifiers. U.S. Pat. No. 3,652,726 describes a polyblend of a rubber-modified terpolymer of styrene, N-2-chlorophenyl maleimide, and acrylonitrile (weight ratio of 62:9:29) with a vinyl chloride resin in an 80:20 weight ratio. The blend exhibited a Vicat softening temperature of 88° C. and had high impact strength. Bourland and Wambach (Journal of Vinyl Technology, Vol. 5, No. 3, p. 121, September, 1983) disclosed the preparation of blends of unmodified vinyl chloride resins and copolymers of styrene and maleic anhydride. Softening temperatures were intermediate between those of the two components.

U.S. Pat. No. 4,255,322 describes the peparation of polyblends of vinyl chloride resins with polyglutarimides which exhibited softening temperatures higher than that of the vinyl chloride resin. The blends were transparent because of the compatibility of the polyglutarimides and vinyl chloride resins. Impact-resistant blends could be prepared by the addition of impact modifiers such as MBS, ABS, coplymers of ethylene and vinyl acetate (EVA), and a graft copolymer of methyl methacrylate and a butyl acrylate-based rubber. Transparent impact—resistant blends could be prepared by the use of MBS with a refractive index which matched that of the blend. Preferred glutarimides used in the blends of U.S. Pat. No. 4,255,322 were those prepared from acrylic polymers such as methyl methacrylate and copolymers thereof by reaction in an extruder reactor with ammonia or methyl amine, according to the method described in Belgian Pat. No. 848,486. Preferred polymers had degrees of imidization of 20 to 60 percent.

Polyglutarimides prepared from polymethyl methacrylate and ammonia have also been blended with other polymers to provide increased softening temperatures. A 60:40 blend of a polyglutarimide with MABS (graft polymer of styrene, acrylonitrile, methyl methacrylate, and rubber) exhibited a heat distortion temperature of 134° C. and had good transparency (Chem. Abst. 99:196,046f, 99, p. 45, 1983). A 50:30:20 blend of a polyglutarimide, ABS, and an ungrafted terpolymer of styrene, alpha-methylstryene, and acrylonitirile exhibited a heat distortion temperature of 123° C. (Chem. Abst. 99:196,047g; 99, p. 45, 1983), A 50:30:20 blend of polyglutarimide, ABS, and an ungrafted terpolymer of styrene, maleic anhydride, and acrylonitrile exhibited a heat distortion temperature of 129° C. (Chem. Abst. 99:196,048h; 99, p. 45, 1983).

SUMMARY OF THE INVENTION

This invention describes the preparation of new polyblends containing a polyglutarimide and a rubber-modified vinyl chloride resin which have distortion temperatures higher than that of the rubber-modified vinyl chloride resin, and also high impact strength and good processability. The blends comprise:

A. 10 to 90 percent by weight of a polyglutarimide prepared by reacting acrylic polymers, particularly polymethyl methacrylate or a copolymer of methyl methacrylate and a minor amount of an ethylenically unsaturated comonomer, with an aminating agent such as ammonia or an amine such as methyl amine, and B. 90 to 10 percent by weight of a rubber-modified vinyl chloride resin prepared by polymerization of vinyl chloride in the presence of 2 to 50 percent, based on the weight of the resin, of a rubber to form a graft copolymer.

The vinyl chloride resin may optionally contain up to 20 percent by weight, based on total monomers, of a copolymerizable, ethylenically unsaturated comonomer. Also, the rubber-modified vinyl chloride resin may contain an unmodified vinyl chloride resin in an amount of between 0-80 percent by weight of the total resin.

DESCRIPTION OF THE INVENTION

Heretofore, the preparation of blends of polyglutarimides with vinyl chloride resins has involved the use of a vinyl chloride resin which might contain various additives, including stabilizers, polymeric processing aids, lubricants, etc. When improved impact strength was required, a traditional impact modifier polymer could be added, as disclosed in U.S. Pat. No. 4,255,322. The impact modifiers named were (a) the butadiene-based MBS and ABS, and (b) the butyl acrylate-based polymethyl methacrylate or copolymrs of methyl methacrylate, styrene, and the like; and (c) copolymers of ethylene and vinyl acetate.

I have discovered that if a rubber-modified vinyl chloride resin is sued in a polyblend with a polyglutarimide, high impact strength can be obtained without the addition of the impact modifiers disclosed in U.S. Pat. No. 4,255,322, and is sometimes superior at both low temperatures (e.g. below 0° C.) and high temperatures. Furthermore, the polyblends of my invention maintain the high heat distortion temperatures of the prior art blends.

The polyglutarimides used in this invention are any known in the art, but are preferably those prepared by the method described in Belgian Pat. No. 848,486, the contents of said Belgian patent being incorporated by reference herein. By this method, acrylic polymers are reacted in an extruder reactor with an aminating agent such as ammonia or methyl amine, so that about 1 to about 100 percent of the acrylic ester groups are imidized. Ethylenically unsaturated comonomers in the acrylic polymer may be a vinyl aromatic monomer such as styrene, an alkyl acrylate, an alkyl methacrylate, acrylic acid, methacrylic acid, and the like.

The preferred polyglutarimides are those prepared from polymethyl methacrylate and ammonia or methyl amine, and the degree of imidization is about 20 to 60 percent. The suitable polyglutarimides generally have Vicat softening temperatures in the range of 130° C. to 180° C., preferably 140° C. to 170° C.

The polyglutarimides contain units of the structural formula:

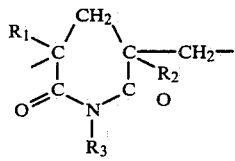

wherein $R_1$, $R_2$ and $R_3$ independently represent hydrogen or $C_1$ to $C_{20}$ unsubstituted or substituted alkyl, aryl, or mixtures thereof. The rubber-modified vinyl chloride resins (graft copolymers) used in the present invention are prepared by polymerizing vinyl chloride and 0 to 20 percent by weight of an ethylenically unsaturated comonomer in the presence of 2 to 50 percent by weight of one or more rubbers, based on the weight of the rubber-modified vinyl chloride resin. The rubber-modified vinyl chloride resin may contain between 0 to 80 percent by weight, preferably 10 to 70 percent by weight, based on the total weight of the resin, of an unmodified vinyl chloride resin. The total weight of the rubber in a mixture of such resins should be at least 2 weight percent.

The preparation of rubber-modified vinyl chloride resins containing 2 to 20 weight percent of rubber has been summarized in my U.S. Pat. Nos. 4,469,844 and 4,469,845. The preparation of some resins containing up to 50 weight percent of rubber, based on the total weight of the rubber-modified vinyl chloride resin, has been summarized in my co-pending application, Ser. No. 636,961, filed Aug. 2, 1984, herein incorporated by reference. However, the present invention is not limited to these methods of preparation.

The preferred rubbers are copolymers of ethylene and up to about 50 percent of vinyl acetate, copolymers of ethylene and an alkyl acrylate in which the alkyl group contains 1 to 8 carbon atoms (particularly those alkyl acrylates in which the alkyl group is a methyl, ethyl, or butyl group), chlorinated polyethylene containing 20 to 40 percent of chlorine, a terpolymer of ethylene, propylene, and a diene termonomer, and butyl acrylate-based rubber.

Especially preferred resins are those containing up to 20 percent of EPDM rubber (a terpolymer of ethylene, propylene, and up to 15 percent, preferably up to 6 percent, of a non-conjugated diene termonomer), prepared by bulk polymerization. Another preferred vinyl chloride resin contains 15 to 35 percent of a mixture of EPDM and an E/VA rubber, prepared by suspension polymerization. The preparation of unmodified vinyl chloride resins was also reviewed in the above co-pending application. Many suitable rubber-modified and unmodified vinyl chloride resins are available commercially.

The compositions of the rubbers are chosen to prevent complete compatibility with the vinyl chloride resin, but yet give a good balance between compatibility and incompatibility, so that the rubber (or graft copolymer) is dispersed as a separate phase, wetted by ungrafted vinyl chloride resin. The products with the lower rubber contents retain some of the characteristics of a rigid vinyl chloride resin with somewhat reduced rigidity and softening temperatures, but with enhanced impact strength. Products containing high rubber contents are generally soft and flexible and do not resemble a rigid vinyl chloride resin.

It should be understood that in a rubber-modified vinyl chloride resin, not all of the polyvinyl chloride chains are actually grafted to the rubber chains, as discussed in U.S. Pat. Nos. 3,812,204, 4,071,582, and 4,012,460. There may be a minor amount of ungrafted rubber, while the amount of polyvinyl chloride grafted to rubber chains usually will vary between about 0.5 and 2.0 times the amount of rubber present, depending on the amount and type of rubber present. When olefin rubbers are used, the amount of grafted polyvinyl chloride is greater for a terpolymer containing a diene monomer than for a saturated copolymer. References to grafted polyvinyl chloride obviously refer to such mixtures. Reference to other graft polymers, or rubber-modified polymers, in the present application also refers to mixtures of ungrafted copolymer of terpolymer chains, chains grafted to rubber, and ungrafted rubber.

Either or both vinyl chloride resins used in the blends of this invention may comprise a homopolymer of vinyl chloride, or a copolymer of vinyl chloride and up to about 20 percent by weight of a copolymerizable, ethylenically unsaturated comonomer such as ethylene, propylene, isobutylene or other alpha-olefin with 4 to 8 carbon atoms, vinyl acetate, vinyl stearate, vinylidene chloride, an alkyl acrylate, acrylic or methacrylic acid, methyl methacrylate, vinyl alkyl ethers in which the alkyl group contains 4 to 20 carbon atoms, and the like. In most instances, the amount of comonomer should be less than 10 percent because of the adverse effect on heat distortion temperature and rigidity. Most preferably, the comonomer is vinyl acetate, ethylene, propylene or isobutylene.

The addition of various ratios of a rubber-modified vinyl chloride resin and an unmodified vinyl chloride resin to the blend provides independent control of the total amount of vinyl chloride resins in the blend and the amount of the dispersed phase of the graft copolymer of rubber and homopolymer or copolymer of vinyl chloride. Thus, a single rubber-modified vinyl chloride resin with optimum characteristics, such as molecular weight, rubber type and content, morphology, rheological properties, etc., can be used in a wide range of compositions while controlling the total amount of the graft copolymer phase added to the blend. One of the vinyl chloride resins may be a homopolymer, while the other is a copolymer. A particularly useful mixture contains a rubber-modified homopolymer and an unmodified copolymer. One resin may have a lower molecular weight than the other, or contain some low molecular weight plasticizer or other additives. Preferably about 10 to 70 percent by weight of the unmodified resin is used. The use of less than 10 percent of the unmodified resin may be insufficient to have a significant effect on the properties of the blend, while the use of more than 80 percent (i.e. less than 20 percent of the rubber-modified resin) usually provides an insufficient amount of the graft copolymer phase in the polyblend, and thus a reduced impact strength. Although the percentage of grafted vinyl chloride homopolymer or copolymer in the rubber-modified resins may vary, frequently a major amount of the total polymerized vinyl chloride homopolymer or copolyer in the resin present is ungrafted.

According to U.S. Pat. No. 4,255,322, polyblends of polyglutarimides and unmodified vinyl chloride resin are transparent, apparently because of a very high degree of miscibility. These two components, however, have refractive indices which do not differ greatly. British Pat. No. 2,015,007 reports that the refractive indices for various vinyl chloride resins are between 1.52 and 1.55. According to Chem. Abst. 99:196046f, 99, p. 45, 1983, a polyglutarimide prepared from poly-methyl methacrylate and ammonia exhibited a refractive index of about 1.54. The refractive index of the polyblend matrix should therefore be close to that of the two components.

Although unmodified vinyl chloride resins may be prepared in transparent form by the proper choice of additives, the rubber-modified resins generally have poor transparency, or are opaque, unless the graft copolymer particles have a matching refractive index, or are very small, e.g. $<0.4\mu$, and preferably $<0.25\mu$ in diameter. In order to obtain a transparent blend with a polyglutarimide, the vinyl chloride resin must be substantially transparent, or the rubber (graft copolymer particles) must have a refractive index which matches closely that of the matrix of the polyblend. U.S. Pat. No. 4,012,460 describes a tranparnt, rubber-modified vinyl chloride resin in which the rubber was a copolymer of ethylene and ethyl acrylate in a weight ratio of 82:18. Transparent polyblends therefore can be prepared using such a vinyl chloride resin and a polyglutarimide.

The thermoplastic blends of the present invention may also have added thereto up to 15 percent by weight, based on the weight of the blend, of an ungrafted rubber. Ungrafted rubbers which may be added to the polyblends include those listed in U.S. Pat. No. 4,469,844 and my aforementioned co-pending application, Ser. No. 636,961, which are suitable for use in the preparation of rubber-modified vinyl chloride resins or copolymers of styrene and maleic anydride, or are suitable for addition to the polyblends described in that patent. Also included are the rubbers which contain carboxyl or sulfonic acid groups attached to the backbone carbon atoms. The preferred rubbers are butyl acrylate-based rubbers, chlorinated polyethylene, E/VA copolymers, copolymers of ethylene and an alkyl acrylate in which the alkyl group contains 1 to 8 carbon atoms, block copolymers of 80 to 50 weight percent of 1,3-butadiene and 20 to 50 weight percent of a vinyl aromatic monomer, chloroprene-based rubbers, and a terpolymer of ethylene, propylene, and up to 15 weight percent of an unconjugated diene monomer (EPDM). If a substantially transparent polyblend is desired, the rubber must be dispersed as very small, discrete particles, preferably $<0.25\mu$, or have a refractive index which matches closely that of the blend matrix. According to British Pat. No. 2,015,007, the block copolymer rubbers containing 25 to 40 percent of styrene exhibit refractive indices close to those of vinyl chloride resins. The chloroprene-based rubbers also exhibit a refractive index in the same range. These rubbers are therefore suitable for use in substantially transparent polyblends.

The thermoplastic blends of the present invention may also have added thereto up to 40 percent by weight, based on the weight of the blend, of:

(a) a copolymer of a vinyl aromatic monomer such as styrene and 20 to 40 weight percent of an ethylenically unsaturated nitrile such as acrylonitrile; or 30 to 80 weight percent of methyl methacrylate; or 30 to 70 weight percent of a mixture of an unsaturated nitrile and methyl methacrylate;

(b) a polymer of methyl methacrylate containfing 0 to 20 weight percent of an alkyl acrylate or 5 to 20 weight percent of a vinyl aromatic monomer; the polymers and copolymers optionally containing up to 60 weight percent, based on the total weight of the copolymer composition, of a substrate rubber grafted with a portion of the copolymer.

Such copolymers which may be added to the polyblends include those which contain a vinyl aromatic monomer and 20 to 40 weight percent of an ethylenically unsaturated nitrile such as acrylonitrile, methacrylonitirle, and ethacrylonitrile (2-pentenenitrile), or 30 to 80 weight percent of methyl methacrylate, or mixtures thereof with the unsaturated nitrile. Particularly desirable are copolymers which contain alpha-methylstyrene or a mixture with styrene or p-methylstyrene, together with acrylonitrile or methacrylonitrile. Especially desired is a copolymer of alpha-methylstyrene and 30 to 40 weight percent of acrylonitrile or methacrylonitrile. Blends containing such copolymers generally exhibit higher softening temperatures than those in which the copolymer contains no alpha-methylstyrene.

Polymers of methyl methacrylate or copolymers thereof may also be added in an amount of up to 40 weight percent. Such methyl methacrylate copolymers include those which contain 80 weight percent of methyl methacrylate and 5 to 20 weight percent of a vinyl aromatic monomer and or up to 20 weight percent of an alkyl acrylate in which the alkyl group contains 1 to 8 carbon atoms. Such copolymers were reviewed in my aformentioned co-pending application, Ser. No. 636,961.

The graft copolymers, which contain up to 60 weight percent of a substrate rubber grafted with a part of the copolymer, include ABS, MBS, and MABS types, and include (a) thoe which serve primarily as impact modifiers, such as those which contain a high rubber content, e.g. 35 to 60 weight percent, and a relatively low proportion of ungrafted copolymer, sometimes 25 percent or less, as in most conventional impact modifiers, so that most of the composition is incompatible with the polyblend matrix; and (b) thermopolastics which contain a lower rubber content and a high proportion of ungrafted copolymer, e.g. 25 to 50 percent or more, which is available for mixing with the polyblend matrix. The rubbers used in the graft copolymers are usually butadiene-based, but may also be acrylate-based (e.g. butyl acrylate-based), olefin-based such as EPDM, chlorinated polyethylene, or other rubber with little or no unsaturation.

It is sometimes preferable to use a mixture of a graft copolymer with additional ungrafted copolymer of the same or different composition, particularly if the graft copolymer contains a relatively small amounts of ungrafted copolymer.

Methods for the preparation of suitable graft copolymers are generally known, and have been summarized in U.S. Pat. No. 4,255,322 and my aformentioned co-pending application, Ser. No. 636,961. Copolymers which contain no rubber are prepared by similar techniques. Many suitable modifiers are available commercially, such as the Blendex and Acryloid series, as summarized in U.S. Pat. No. 4,454,300.

The polyglutarimide and rubber-modified vinyl chloride resin, and optional components, may be blended, in the prescribed amounts, by mechanically working the components at a temperature high enough such that the mass is plasticized, e.g. by mixing on a two-roll mill, an internal mixer such as a Brabender or Banbury mixer, an extruder, or a Ferrell mixer. In order to provide a homogenous blend, the mixing equipment must provide a high shear. It is sometimes preferable to use a twin-screw extruder, rather than a single-screw extruder. In some cases, it may be necessary to plasticize first the component which has the highest melt viscosity and then add the other components in one or more increments. A batch mixer, or a high shear continuous mixer with one or more side feed ports, might be used.

When more than two components are blended, it may sometimes be desirable to prepare first an intimate mixture of two components by blending. This preblend is then blended with the other components. For example, an ungrafted rubber or copolymer (rubber-modified or unmodified) may be preblended with the polyglutarimide; this preblend may then be blended with the vinyl chloride resin and optional components. An ungrafted rubber or copolymer may be preblended with the vinyl chloride resin, and the preblend then blended with the polyglutarimide. In some cases, it may be preferable to preblend a portion of an optional component into both the polyglutarimde and the vinyl chloride, and then blend the two preblends. When more than one optional component is used, it may sometimes be desirable to preblend one with the polyglutarimide, and another with the vinyl chloride resin. The invention, however, is not limited to any order in which the components are blended.

The various components of the blends will exhibit different heat distortion temperatures, depending on the amount and type of comonomer in the polyglutarimide or vinyl chloride resin, the degree of imidization in the polyglutarimide, and whether ammonia or an amine is used in the preparation of the polyglutarimide. The heat distortion temperature will also be influenced by the amount of rubber, plasticizer, processing aids, stabilizers, and other additives used. Usually, the heat distortion temperature of a polyblend will be intermediate between those of the polyglutarimide and the vinyl chloride resin.

The following illustrates the types and amounts of the components used in the blended compositions of the present invention which will exhibit heat distortion temperatures significantly higher than those of the vinyl chloride resins used in the blends. All percent limitations in compositions of the present application are percent by weight. Heat distortion temperatures are measured according to ASTM test method D648 at 264 psi. using samples annealed at 50° C. If the samples are annealed at 70° C. or higher, the difference between the softening temperature of the blends and of the vinyl chloride resins will be significantly greater. (See U.S. Pat. No. 4,454,300 for test methods.)

As an example of the blends of the present invention, a blend is prepared of the following components: (1) about 30 weight percent of a polyglutarimide of polymethyl methacrylate and methyl amine, with a softening temperature of about 140° C., similar to that described in Example 9 of U.S. Pat. No. 4,255,322; and (2) about 70 weight percent of a rubber-modified vinyl chloride resin having a heat distortion temperature of about 67° C., which contains 14 weight percent, based on the weight of the resin, of a rubber of ethylene, propylene and a diene termonomer, prepared by a method similar to that described in U.S. Pat. No. 4,454,300. The resultant blend will exhibit a heat distortion temperature of about 80° C. or slightly higher, and an impact strength significantly higher than would be obtained for a comparable blend containing an unmodified vinyl chloride resin. A similar result will be obtained if the polyglutarimide is prepared from a copolymer containing methyl methacrylate and ethyl acrylate in a 95:5 weight ratio.

As a second example, a polyglutaimide with a Vicat softening temperature of about 170° C., prepared from polymethyl methacrylate and methyl amine, is blended with the rubber-modified vinyl chloride resin of the previous example, in the amounts listed therein. The resultant blend will exhibit a heat distortion temperature of about 88° C.

As a third example, a blend is prepared from the following components: (1) about 60 weight percent of a polyglutarimide of polymethyl methacrylate and ammonia, with a Vicat softening temperature of about 165° C., similar to that described in Example 1 of U.S. Pat. No. 4,255,322; and (2) about 40 weight percent of a rubber-modified vinyl chloride resin (with a heat distortion temperature of about 65° C.), which contains about 22 weight percent, based on the weight of the resin, of a mixture of about equal amounts of a rubber of ethylene, propylene, and a diene termonomer and a rubber of ethylene and vinyl acetate, prepared by a method similar to that described in Chem. Abstr. 97:56665r, Aug. 23, 1982, p. 32. The resultant blend will exhibit a heat distortion temperature of about 105° C. and an impact strength significantly higher than would be obtained for a comparable blend of the polyglutarimide and an unmodified vinyl chloride resin. A higher impact strength will be obtained if an MBS resin, e.g. 10–20 weight percent based on the weight of the blend, is added, although there will be a slight reduction in the Vicat softening temperature. An ungrafted rubber may also be added to the blend.

As a fourth example, results similar to those obtained in the previous example will be obtained if the rubber-modified vinyl chloride resin contains about 25 weight percent of a rubber of a terpolymer of ethylene, propylene, and a diene termonomer, similar to that described in Chem. Abstr. 98:35,500, Feb. 2, 1983.

The present blends provide high impact strengths and high heat distortion temperatures, with good processability.

What is claimed is:

1. A thermoplastic blend comprising:
   10–90 percent by weight of a olyglutarimide prepared by reacting an acrylic polymer with an aminating agent selected from the group consisting of ammonia and an amine selected from the group consisting of alkyl and aryl amines containing 1 to 20 carbon atoms; and
   90–100 percent by weight of a rubber-modified vinyl chloride resin prepared by polymerization of vinyl chloride in the presence of 2 to 50 percent, based on the weight of the resin, of a rubber to form a graft copolymer, which rubber-modified vinyl chloride resin contains 0–80 percent by weight of an unmodified vinyl chloride resin, based on the total weight of the resin.

2. The thermoplastic blend as defined in claim 1 wherein said polyglutarimide is prepared by reacting polymethyl methacrylate with ammonia.

3. The thermoplastic blend as defined in claim 1 wherein said polyglutarimide is prepared by reacting polymethyl methacrylate with methyl amine.

4. The thermoplastic blend as defined in claim 1 wherein said polyglutarimide is prepared by reacting a copolymer of methyl methacrylate and a minor amount of an ethylenically unsaturated comonomer with an aminating agent selected from the group consisting of ammonia and methyl amine.

5. The thermoplastic blend as defined in claim 1 wherein said rubber-modified vinyl chloride resin contains up to 20 percent by weight, of total monomers, of a copolymerizable, ethylenically unsaturated comonomer.

6. The thermoplastic blend as defined in claim 1 wherein said rubber-modified vinyl chloride resin contains an unmodified vinyl chloride resin in an amount of between 10–70 percent by weight of the total resin.

7. The thermoplastic blend as defined in claim 1 wherein there is added up to 40 weight percent, based on the weight of the total blend, of a copolymer selected from the group consisting of (a) a copolymer of a vinyl aromatic monomer and 20 to 40 percent by weight of an ethylenically unsaturated nitrile, (b) a copolymer of a vinyl aromatic monomer and 30 to 80 percent by weight of methyl methacrylate; and (c) a copolymer of a vinyl aromatic monomer and 30 to 70 percent by weight of a mixture of an ethylenically unsaturated nitrile and methyl methacrylate.

8. The thermoplastic blend as defined in claim 7 wherein said copolymer contains up to 60 percent by weight, based on the total weight of the copolymer, of a substrate rubber grafted with a portion of said copolymer.

9. The thermoplastic blend as defined in claim 1 wherein there is added up to 40 weight percent, based on the weight of the total blend, of a polymer of methyl methacrylate containing 0 to 20 percent by weight of an alkyl acrylate containing 1–8 carbon atoms.

10. The thermoplastic blend as defined in claim 9 wherein said polymer contains up to 60 percent by weight, based on the total weight of the polymer, of a substrate rubber grafted with a portion of said polymer.

11. The thermoplastic blend as defined in claim 1 wherein there is added up to 40 weight percent, based, on the weight of the total blend, of a copolymer of methyl methacrylate and up to 20 percent by weight, of the copolymer, of a vinyl aromatic monomer.

12. The thermoplastic blend as defined in claim 11 wherein said copolymer contains up to 60 percent by weight, based on the total weight of the copolymer, of a substrate rubber grafted with a portion of said copolymer.

13. The thermoplastic blend as defined in claim 1 wherein there is added up to 15 percent by weight, based on the weight of the total blend, of an ungrafted rubber.

14. The thermoplastic blend as defined in claim 1 wherein the rubber, in said rubber-modified vinyl chloride resin, is selected from the group consisting of a terpolymer of ethylene, propylene, and a diene termonomer; a copolymer of ethylene and vinyl acetate; a butyl acrylate-based rubber; and a copolymer of ethylene and an alkyl acrylate selected from the group consisting of methyl acrylate, ethyl acrylate and butyl acrylate.

15. The thermoplastic blend as defined in claim 1 wherein the rubber, in the rubber-modified vinyl chloride resin, is an EPDM rubber, in an amount of up to 20 weight percent, and all of the vinyl chloride is polymerized in the presence of said rubber.

* * * * *

UNITED STATES PATENT OFFICE
CERTIFICATE OF CORRECTION

PATENT NO. : 4,595,727
DATED : June 17, 1986
INVENTOR(S) : Kenneth W. Doak

It is certified that error appears in the above-identified patent and that said Letters Patent is hereby corrected as shown below:

In Claim 1, line 8:

"90-100" should read ---90-10---.

Signed and Sealed this

Twenty-sixth Day of June, 1990

Attest:

HARRY F. MANBECK, JR.

Attesting Officer / Commissioner of Patents and Trademarks